(12) United States Patent
Terunuma et al.

(10) Patent No.: US 6,678,941 B1
(45) Date of Patent: Jan. 20, 2004

(54) METHOD FOR MANUFACTURING A THIN FILM MAGNETIC HEAD

(75) Inventors: Koichi Terunuma, Chuo-ku (JP); Tetsuya Mino, Chuo-ku (JP); Katsuya Kanakubo, Chuo-ku (JP); Noriyuki Ito, Chuo-ku (JP)

(73) Assignee: TDK Corporation, Tokyo (JP)

( * ) Notice: Subject to any disclaimer, the term of this patent is extended or adjusted under 35 U.S.C. 154(b) by 219 days.

(21) Appl. No.: 09/603,970

(22) Filed: Jun. 26, 2000

(30) Foreign Application Priority Data

Jun. 29, 1999 (JP) .......................................... 11-184439

(51) Int. Cl.[7] .......................... G11B 5/127; H04R 31/00
(52) U.S. Cl. ................................. 29/603.15; 29/603.14
(58) Field of Search .......................... 29/603.14, 603.15

(56) References Cited

U.S. PATENT DOCUMENTS 5,606,478 A    2/1997   Chen et al.

FOREIGN PATENT DOCUMENTS

JP    A-5-73839    3/1993

*Primary Examiner*—Richard Chang
(74) *Attorney, Agent, or Firm*—Oliff & Berridge PLC

(57) ABSTRACT

The invention is a method of manufacturing thin film magnetic heads usable for magnetic recording and reproducing drive devices such as magnetic disk drive devices. The method is characterized by forming a first magnetic film in a primary pattern which is larger than its definitive pattern and of which its edges are located within frames which are used in a frame-plating method for a second magnetic film. The second magnetic film is then formed by the frame-plating method and the first magnetic film is etched into its definitive pattern by using the second magnetic film as a mask.

4 Claims, 19 Drawing Sheets

METHOD FOR MANUFACTURING A THIN FILM MAGNETIC HEAD

BACKGROUND OF THE INVENTION

1. Field of the Invention

This invention relates to a method for manufacturing a thin film magnetic head usable for a magnetic recording and reproducing drive device such as a magnetic disk drive device.

2. Related Art Statement

For realizing a high recording density in a magnetic disk using a thin film magnetic head, it is required that data amount (data density) to be restored in the unit area of the magnetic disk is enhanced. The surface recording density depends on performance of a recording element, and can be enhanced by shortening the gap length between the recording poles of the recording element.

The surface recording density can be also enhanced by increasing the track number to be recorded in the magnetic disk. The track number recordable in the magnetic disk is normally represented as "TPI (track per inch)". The TPI performance of the recording element can be enhanced by downsizing the recording head to determine the width of the data track. The size of the recording head is normally known as a track width.

However, the shortening of the gap length between the recording poles and the narrowing of the track width decrease the magnetic flux in between the recording poles, resulting in the degradation of the overwrite performance. Therefore, in view of recording performance, the shortening of the gap length and the narrowing of the track width can not employed for a high density recording magnetic disk having a high coercivity Hc.

To solve this problem, the recording pole structure in which in a recording pole portion, a magnetic film having a high saturated magnetic flux density (a first magnetic film) is provided adjacent to a gap film and a second magnetic film having a smaller saturated magnetic flux density than the first magnetic film is provided on the first magnetic film is suggested and practically used. For example, the specification of U.S. Pat. No. 5,606,478 discloses that the part of the recording pole portion adjacent to the gap film is made of a magnetic material having a higher saturated magnetic flux, for example $Ni_{55}Fe_{45}$, than the magnetic material having a NiFe composition which is usually used for the pole portion of the above thin film magnetic head. However, the $Ni_{55}Fe_{45}$ material has only 1.4T to 1.5T, so that the recording performance is restricted.

In addition, the specification of Kokai Publication Kokai Hei 5-73839 (JP A 5-73839) discloses that an underfilm to plate a bottom magnetic core and a top magnetic core is made of a magnetic material having a higher saturated magnetic flux density than the magnetic materials constituting the bottom magnetic core and the top magnetic core.

In defining the track width of the recording pole portion using the above means in those related documents, the underfilm made of the magnetic film having the higher saturated magnetic flux density has to be etched by milling, etc. In the etching process, the part of the magnetic material constituting the underfilm is re-stuck on the side surfaces, etc. of the pole portion, resulting in the increase of the track width. This means the opposite result to the narrowing of the track width. Moreover, the re-stuck portion of the pole portion usually has inferior magnetic characteristics, so that the electromagnetic conversion characteristics of the pole portion is deteriorated.

If the underfilm is thinner, the re-sticking can be reduced. However, the thinner underfilm can not realize the essential object of enhancing the recording performance by making the underfilm of the magnetic material having a high saturated magnetic flux density. The above related documents do not disclose the means for solving the above problems due to the re-sticking.

SUMMARY OF THE INVENTION

It is an object of the present invention to provide a method for manufacturing a thin film magnetic head in which the re-sticking is almost never brought about if a magnetic film, provided adjacent to a write gap film, having a high saturated magnetic flux density is thicker.

It is another object of the present invention to provide a method for manufacturing a thin film magnetic head having a recording pole structure of high recording performance.

For accomplishing the objects, this invention is directed to a method for manufacturing a thin film magnetic head including a recording pole portion. The recording pole portion includes a first pole portion, a gap film adjacent to the first pole portion and a second pole portion adjacent to the gap film. The second pole portion has a first magnetic film and a second magnetic film. The first magnetic film has a higher saturated magnetic flux density than the second magnetic film and is provided adjacent to the gap film, and the second magnetic film is provided adjacent to the first magnetic film.

In manufacturing the above thin film magnetic head, the manufacturing method of the present invention has the steps of forming, on the gap film, the first magnetic film in a primary pattern after forming the first pole portion and the gap film and of forming the second magnetic film by a frame-plating method.

In the above steps, the primary pattern is formed so that its size can be larger than the definitive pattern of the first magnetic film and its edges can be located within frames to be used in the frame-plating method.

According to the manufacturing method, the etching of the first magnetic film in the definitive pattern by dry-etching such as RIE or milling using the second magnetic film as a mask can remove the re-stuck magnetic material of the first magnetic film from the both side surfaces of the first and second magnetic films in the track direction. After the first magnetic film is etched in the definitive pattern, the re-sticking does not occur. Consequently, even if the first magnetic film having a high saturated magnetic flux density is thicker, the re-sticking almost never occur.

Moreover, this invention discloses two modes of the manufacturing method concretely.

First Mode-Manufacturing Method

The first mode-manufacturing method includes the following steps.

First of all, a magnetic film to be the first magnetic film is formed on the gap film. Then, a mask having a pattern larger than the definitive pattern of the first magnetic film is formed on the magnetic film. The part of the magnetic film uncovered with the mask is removed to form the first magnetic film having the primary pattern.

Subsequently, an plate underfilm is formed on the first magnetic film having the primary pattern and the gap film. Then, frames for frame-plating the second magnetic film is formed on the plate underfilm. The frames are separated on the first magnetic film in the parallel track direction thereto and cover the both edges of the first magnetic film and the gap film around the both edges in the track direction.

Subsequently, a plate film to be the second magnetic film is stuck on the part of the plate underfilm uncovered with the frame, and thereafter, the frame is removed.

Next, the part of the plate underfilm which is exposed followed by the removing of the frame is removed. Since the plate underfilm is extremely thin, the material constituting the plate underfilm is not stuck on the both side surfaces of the first and second magnetic films in the track direction even if the plate underfilm is removed by dry-etching such as milling or reactive ion etching (hereinafter, abbreviated to "RIE"). Moreover, since the first magnetic film is patterned to have the primary pattern, in removing the plate underfilm, only the plate underfilm has to be etched and the first magnetic film dose not have to. Therefore, the above conventional problems due to the re-sticking of magnetic material constituting the first magnetic film can be prevented.

Furthermore, although the second magnetic film is exposed to the dry-etching in the above removing process of the plate underfilm by the dry-etching, the extremely thin plate underfilm can repress the reduction of the second magnetic film to the utmost. Therefore, the thin film magnetic head having the recording pole structure with a high recording performance can be provided.

Then, the plate underfilm is removed and a mask to cover the first and second magnetic films is formed. The parts of the plate film and the plate underfilm uncovered with the mask are removed. The plate film and the plate underfilm may be removed by RIE, milling, chemical etching or the like. Since the first and second magnetic films are covered with the mask, they are not reduced.

The mask is removed and the first magnetic film is patterned in the definitive pattern. Since the first magnetic film has the primary pattern which is larger than the definitive pattern and of which edges are located within the frame to be used in the frame-plating method, the etching of the first magnetic film can remove the re-stuck magnetic material of the first magnetic film from the both side surfaces of the first and second magnetic films in the track direction in patterning the first magnetic film in the definitive pattern by dry-etching such as RIE or milling.

Moreover, at the time of patterning the first magnetic film, the plate film to be the second magnetic film and the plate underfilm are already removed around the first magnetic film. Therefore, if the magnetic material of the first magnetic film is re-stuck in the both side surfaces of the first and second magnetic films in the track direction due to the patterning of the first magnetic film by dry-etching such as RIE or milling, the re-stuck magnetic material can be removed from the both sides of the first and second magnetic films having no obstacles in the track direction. Therefore, if the first magnetic film having a high saturated magnetic flux density provided adjacent to the gap film is thick, the re-sticking almost never occur.

Furthermore, since the reduction of the second magnetic film can be repressed to the utmost through the whole process, the thin film magnetic head having the recording pole structure having a high recording performance can be provided.

Second Mode-Manufacturing Method

The second mode-manufacturing method includes the following steps.

First of all, a non-magnetic film is formed entirely on a gap film. Then, a hollowed hole having a pattern corresponding to the primary pattern of the first magnetic film is formed in the non-magnetic film.

Subsequently, a magnetic film to be the first magnetic film is formed on the non-magnetic film and the part of the gap film exposed to the bottom of the hollowed hole.

Next, the first magnetic film is flattened so that the surface of the part of the first magnetic film in the hollowed hole can have the substantially same level as that of the non-magnetic film to form the primarily patterned first magnetic film.

Thereafter, the similar steps to the first mode-manufacturing method are carried out. As a result, the similar operation and effect to the first mode-manufacturing method can be obtained and the objects of the present invention can be achieved.

The other objects, constructions and advantages of the present invention will be described in detail, with reference to the attached drawings in the following embodiments.

BRIEF DESCRIPTION OF THE DRAWINGS

For a better understanding of this invention, reference is made to the attached drawings, wherein.

DETAILED DESCRIPTION OF PREFERRED EMBODIMENTS

Thin Film Magnetic Head in a First Embodiment

Figure 1:
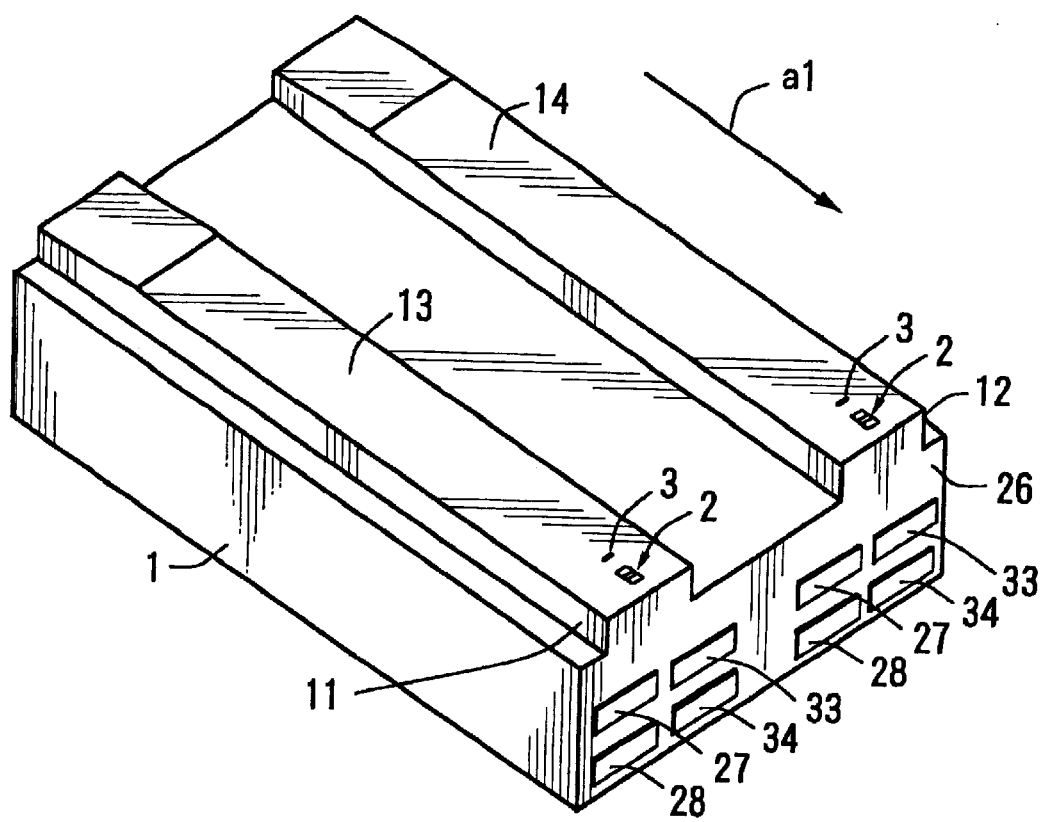
FIG. 1 is a perspective view of a thin film magnetic head obtained by the manufacturing method of the present invention.
Figure 2:
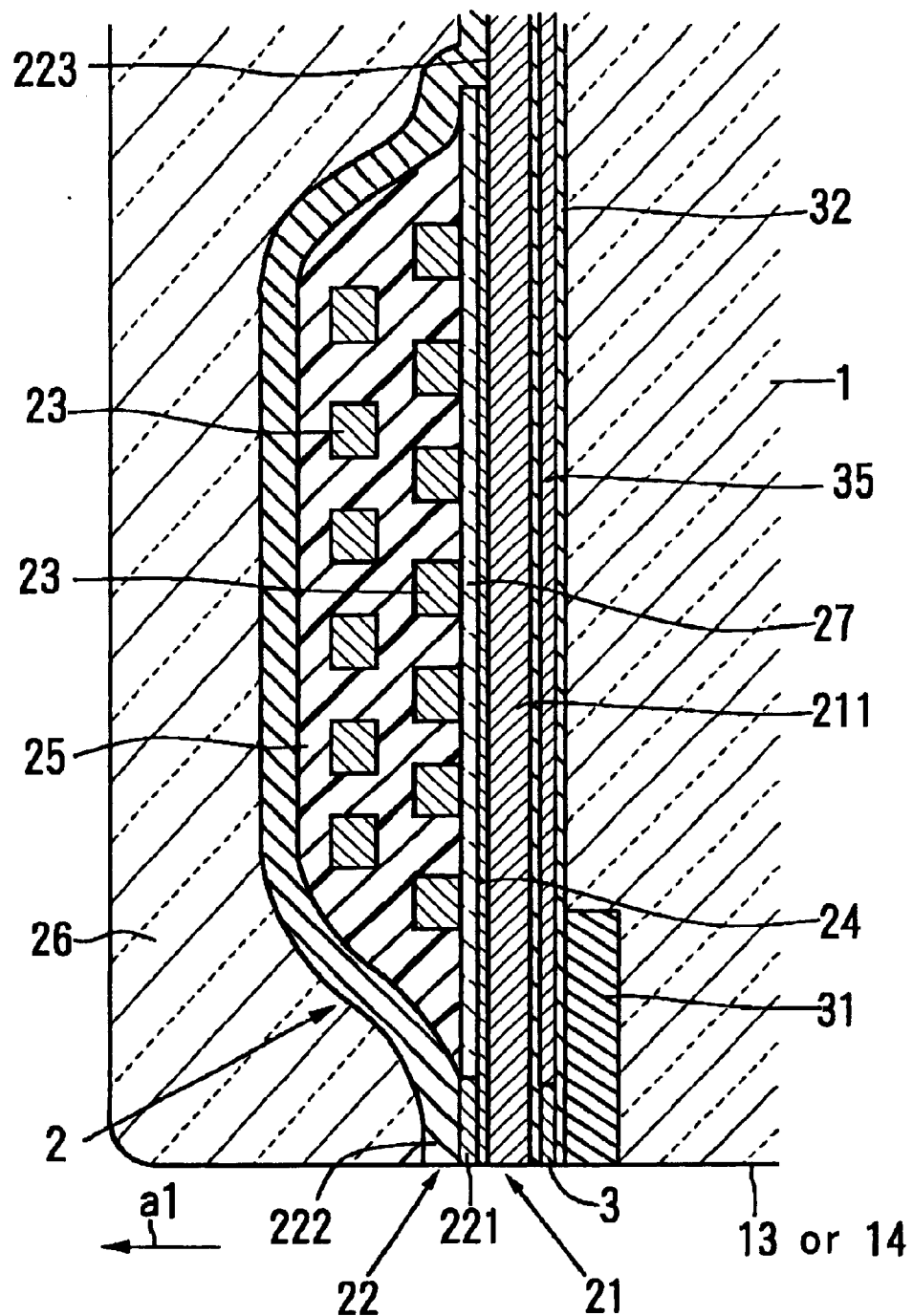
FIG. 2 is a cross sectional view of the thin film magnetic head shown in FIG. 1.

FIG. 1 is a perspective view showing a thin film magnetic head obtained by the manufacturing method of the present invention, and FIG. 2 is a cross sectional view of the thin film magnetic head depicted in FIG. 1. In the figures, the size of each part is exaggerated. The illustrated thin film magnetic head comprises a slider 1, at least one recording element 2 and a reading element 3 composed of a magnetoresistive effective element (hereinafter, often called as a "MR reading element").

The slider 1 has rail parts 11 and 12 on its opposing surface to a magnetic recording medium, and the surfaces of the rail parts 11 and 12 are employed as air bearing surfaces (hereinafter, often called as "ABSs") 13 and 14. The slider 1 does not always have the two rail parts 11 and 12, and may have one to three rail parts. Moreover, the slider may have a flat surface having no rail part. For improving its floating characteristic, the slider may have an opposing surface with various geometrical shape to a recording medium. The method of the present invention can be applied for the sliders having the above various types of surface. The slider 1 is made of a ceramic material such as AlTiC.

The recording elements 2 and MR reading element 3 are provided on either edge or both edges of the rail parts 11 and 12 in a recording medium-moving direction a1. The recording medium-moving direction a1 corresponds to the flow out direction of air at the time of the high velocity moving of the recording medium.

The recording element 2 is stacked on the MR reading element 3. Conversely, the MR reading element 3 may be stacked on the recording element 2. The recording element 2 includes a recording pole portion. The recording pole portion has a first pole portion 21, a gap film 24 adjacent to the first pole portion 21 and a second pole portion 22 adjacent to the gap film 24.

The first pole portion 21 includes a magnetic film 221. The magnetic film 211 is formed, of a soft magnetic material such as NiFe, CoFe, CoNiFe, in a thickness of 0.5 $\mu$m to 4 $\mu$m. The magnetic film 211 is elongated backward from the ABSs 13 and 14 to function as a first yoke portion.

The gap film 24 may be made of a non-magnetic insulating material such as $Al_2O_3$, $SiO_2$ or a non-magnetic metallic material. In making the film of the non-magnetic insulating material such as $Al_2O_3$, $SiO_2$, a sputtering method etc. may be used. In making the film of the non-magnetic metallic material, a plating method or a sputtering method can be used. The thickness of the gap film is preferably 0.01–0.5 $\mu$m.

The second pole portion 22 includes a first magnetic film 221 and a second magnetic film 222. The first magnetic film 221 has a larger saturated magnetic flux density than the second magnetic film 222 and is located adjacent to the gap film 24. The first magnetic film 221 is made of a large coercivity magnetic material such as FeN, FeMN, FeMC, FeMON (M=B, Al, Si, Cr, Ti, Hf, Nb, Ta, Zr, Mo, etc.). The second magnetic film 222 is formed, of a soft magnetic material such as NiFe, CoFe, CoFeNi, in a thickness of about 3 $\mu$m to 5 $\mu$m. As the forming method, a dry-etching method to narrow the track width as well as a frame-plating method may be employed. The details will be described hereinafter.

The second magnetic film 222 is adjacent to the first magnetic film 221. The second magnetic film 222 is elongated backward from the ABSs 13 and 14 alongside the surface of the coil insulating film 25 to support a coil film 23 to function as a second yoke portion. The backward portion of the second magnetic film 222 is joined to the magnetic film 211 elongated from the first pole portion 21 at a joining portion 223 so as to complete a magnetic circuit. In FIG. 2, the first magnetic film 221 is provided only at the recording pole portion, but may be entirely under the second magnetic film 222.

The coil film 23 is formed on the coil insulating film 25 so as to wind spirally the joining portion 223. The coil insulating film 25 is preferably formed by hardening a photoresist material. The layer number and thickness of the coil insulating film 25 depends on the layer number of the coil film 23 and the coil supporting structure. Generally, the coil insulating film has a thickness of about 3 $\mu$m to 20 $\mu$m. The coil film 23 is formed of a conductive material such as Cu. The thickness of the coil film 23 is preferably 2–5$\mu$m. The coil film 23 may be formed by a frame plating method, etc. The coil film 23 constitutes a thin film magnetic circuit with the magnetic film 211 elongated from the first pole portion 21, the first and second magnetic films 221, 222 and the gap film 24. The coil film 23 is supported by the coil supporting film 25 and is formed so as to wind spirally the joining portion of the yoke portion. Both ends of the coil film 23 are conductively connected to taking out electrodes 27 and 28 (see, FIG. 1). In this embodiment, the coil film 23 has a two-layered structure.

The area around the first and second pole portions 21, 22 and the gap film 24 is embedded by a non-magnetic insulating film 27 made of $Al_2O_3$, $SiO_2$, etc.

The recording element 2 is covered with a protection film 26 entirely. The protection film 26 may be formed of an insulating material such as $Al_2O_3$, $SiO_2$, etc. Moreover, the thickness of the protection film 26 is preferably about 5 μm to 50 μm by sputtering, etc.

As the MR reading element, various film structures have been proposed and practically used. For example, a MR element using an anisotropic magnetoresistive (IMR) effective element made of permally, etc., a giant magnetoresistive (GMR) effective film made of a spin valve structuremagnetic material or a perovskite type magnetic material or a ferromagnetic tunnel connection element is exemplified. In this invention, any kind of the above film structures may be employed. The MR reading element 3 is placed, between a first shield film 31 and the first magnetic film 211 doubling as a second shield film, in an insulating film 32. The insulating film 32 is made of alumina, etc. The MR reading element 3 is connected to the taking out-electrodes 33 and 34 (see, FIG. 1) via a leading conductor 35 (see, FIG. 2).

In the illustrated thin film magnetic head, since the slider 1 has ABSs 13 and 14 on its medium opposing surface, and the recording element 2 and the MR reading element 3 are provided on the slider 1, the thin film magnetic head can be employed as a floating type thin film magnetic head by combining a magnetic recording medium such as a magnetic disk.

Since the backward portion of the second magnetic film 222 is magnetically joined to the magnetic film 211 elongated from the first pole portion 21, the magnetic field generated by flowing a writing current in the coil film 23 can be effectively conducted to the first pole portion 21 and the second pole portion 22 via the second magnetic film 222 and the magnetic film 221 elongated from the first pole portion 21.

Figure 3:
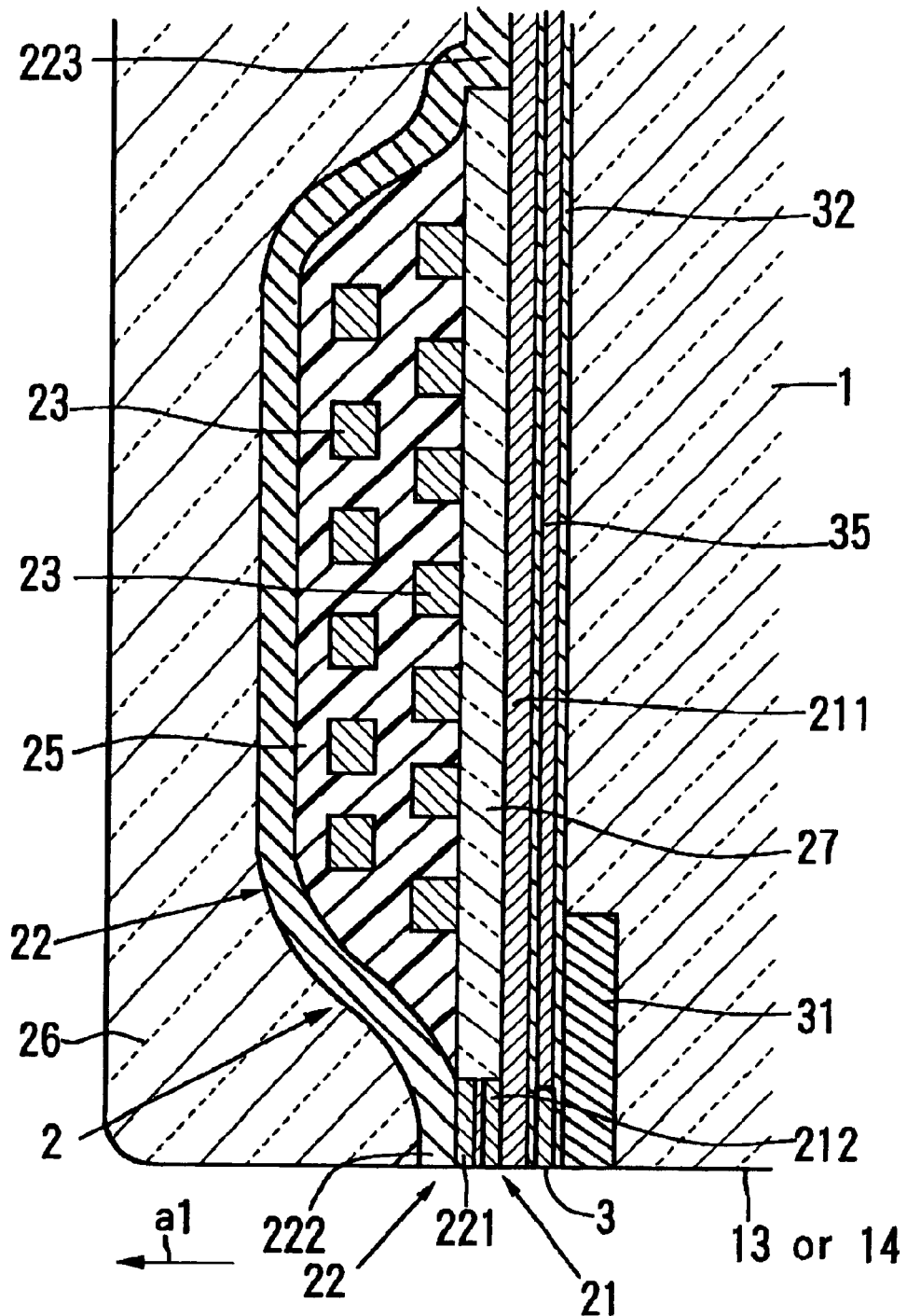
FIG. 3 is a cross sectional view of a thin film magnetic head different from that of FIG. 1.

FIG. 3 is a cross sectional view showing another thin film magnetic head obtained by the manufacturing method of the present invention. In this figure, the same references are given to the similar parts to the ones in FIG. 2. The thin film magnetic head illustrated in FIG. 3 is characterized in that the first pole portion 21 has, on the magnetic film 211, a magnetic film 212 with a larger saturated magnetic flux density than the magnetic film 211. The magnetic film 212 is made of a large saturated magnetic flux density material such as FeN, FeMN, FeMC, FeMON (M=B, Al, Si, Cr, Ti, Hf, Nb, Ta, Zr, Mo, etc.).

Next, the example in which the thin film magnetic head in FIGS. 1 and 2 is made by the first mode-manufacturing method will be described hereinafter. FIGS. 4-17 are cross sectional views showing the steps included in the first mode-manufacturing method of the present invention. In these figures, the same references are given to the similar parts to the ones in FIGS. 1 and 2. The manufacturing method is performed on a wafer.

Figure 4:
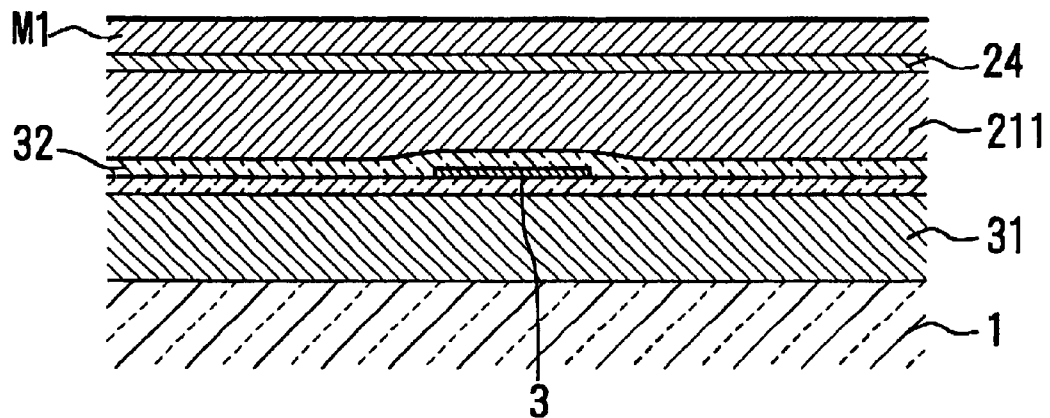
FIG. 4 is a cross sectional view showing one step included in the first mode-manufacturing method of the thin film magnetic head shown in FIGS. 1 and 2.

First of all, as shown in FIG. 4, after the first shielding film 31, the insulating film 32, the MR reading element 3, the magnetic film 211 to be a second shielding film and the gap film 24 are formed by a well known process, a magnetic film M1 to constitute the first magnetic film 221 (see, FIG. 2) is formed on the gap film 24. The magnetic film M1 is made of a large coercivity magnetic material such as FeN, FeMN, FeMC, FeMON (M=B, Al, Si, Cr, Ti, Hf, Nb, Ta, Zr, Mo, etc.). The magnetic film M1 may be formed by sputtering, plating or the like.

Figure 5:
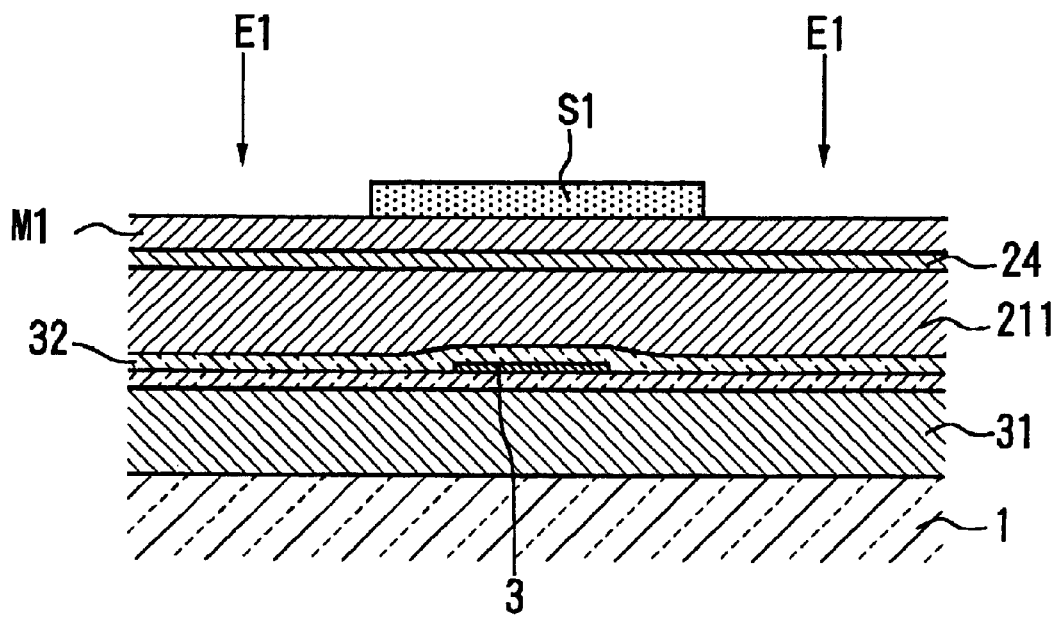
FIG. 5 is a cross sectional view showing the step after the step of FIG. 4.

Next, as shown in FIG. 5, a mask S1 having a pattern larger than the definitive pattern of the first magnetic film 221 is formed on the magnetic film M1 to constitute the first magnetic film 221. The mask S1 may be made of a photoresist material by a photolithography process.

Figure 6:
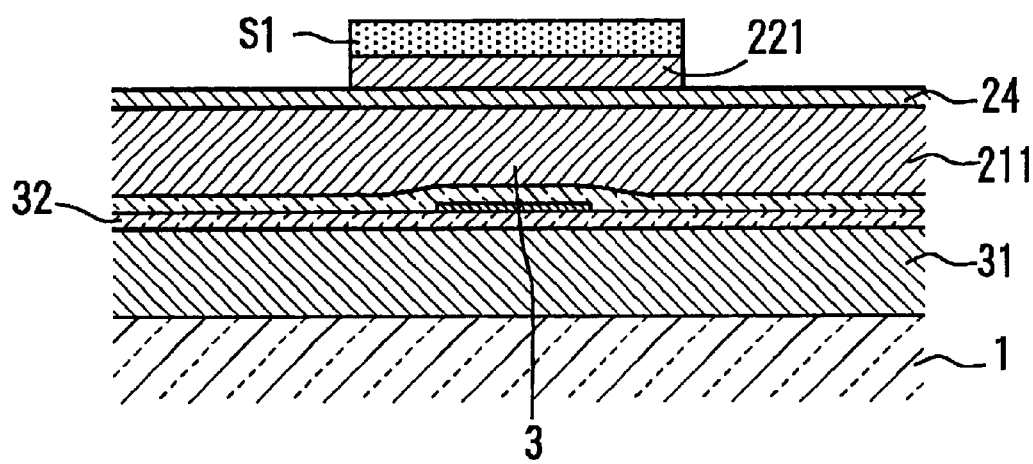
FIG. 6 is a cross sectional view showing the step after the step of FIG. 5.
Figure 7:
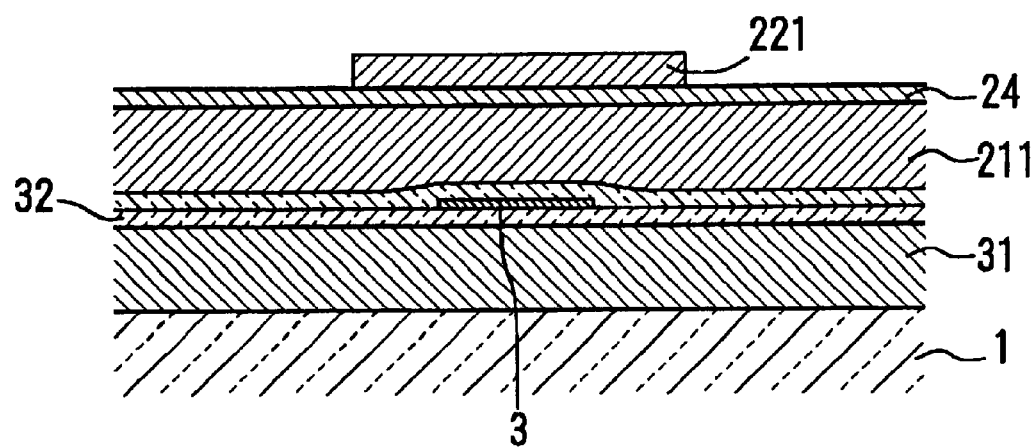
FIG. 7 is a cross sectional view showing the step after the step of FIG. 6.

Subsequently, as shown in FIG. 6, the part of the magnetic film M1 uncovered with the mask S1 is removed. A dry-etching method such as milling or RIE is suitable for the removing means. Thereafter, the mask S1 is removed and the first magnetic film 221 having the primary pattern is obtained as shown in FIG. 7. The primary pattern of the first magnetic film 221, as described later, is larger than the definitive pattern thereof, and edges of the primary pattern are located within the frames to be used in the frame-plating method for the second magnetic film.

Figure 8:
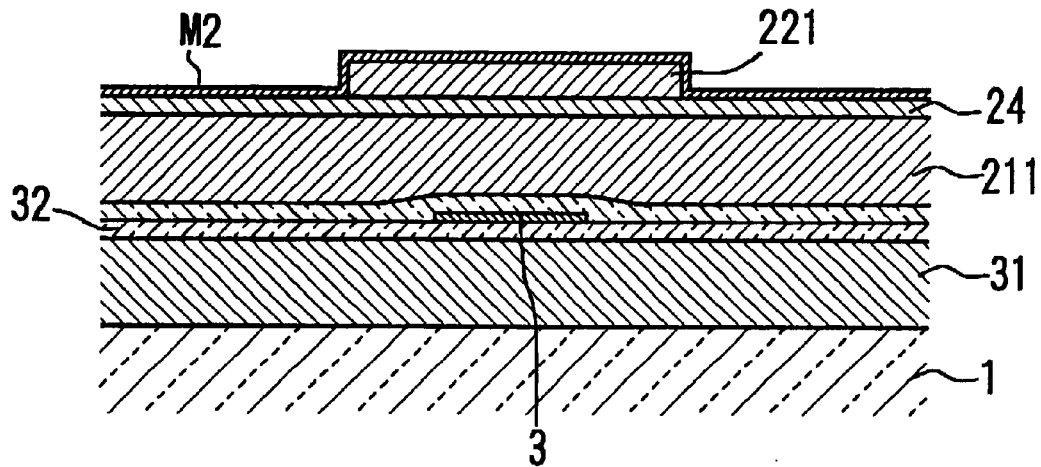
FIG. 8 is a cross sectional view showing the step after the step of FIG. 7.

Next, as shown in FIG. 8, a plate underfilm M2 is formed on the first magnetic film having a primary pattern and the gap film 24. The plate underfilm M2 is formed, of a magnetic material such as NiFe, in an extremely thin thickness of 5 μm to 100 μm by sputtering, for example.

Figure 9:
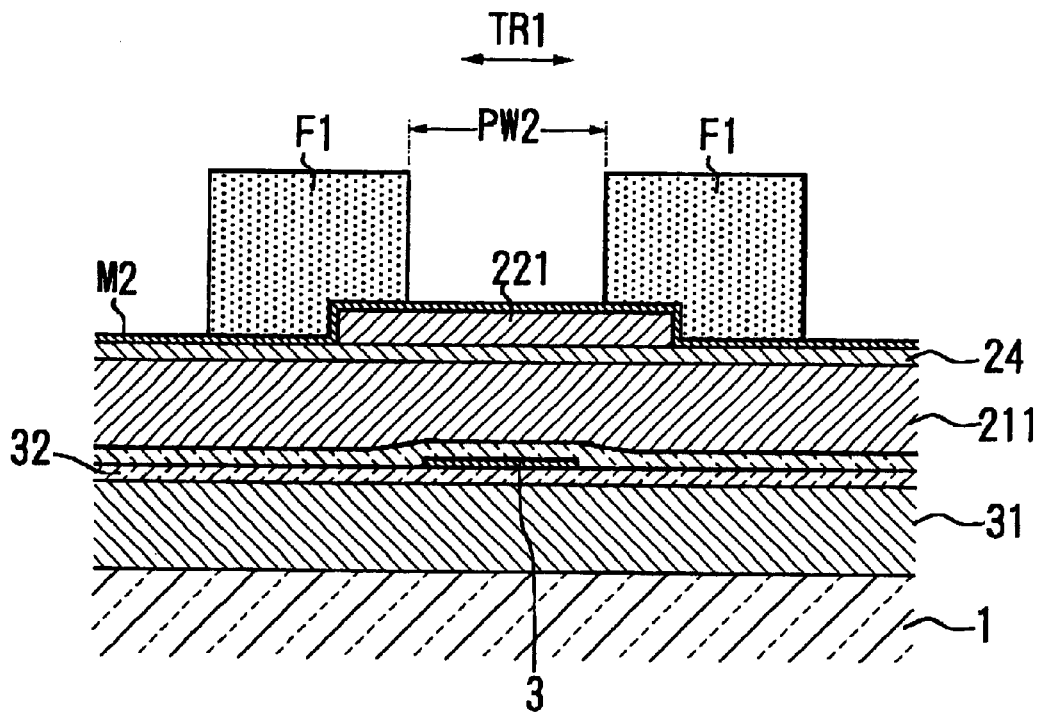
FIG. 9 is a cross sectional view showing the step after the step of FIG. 8.
Figure 10:
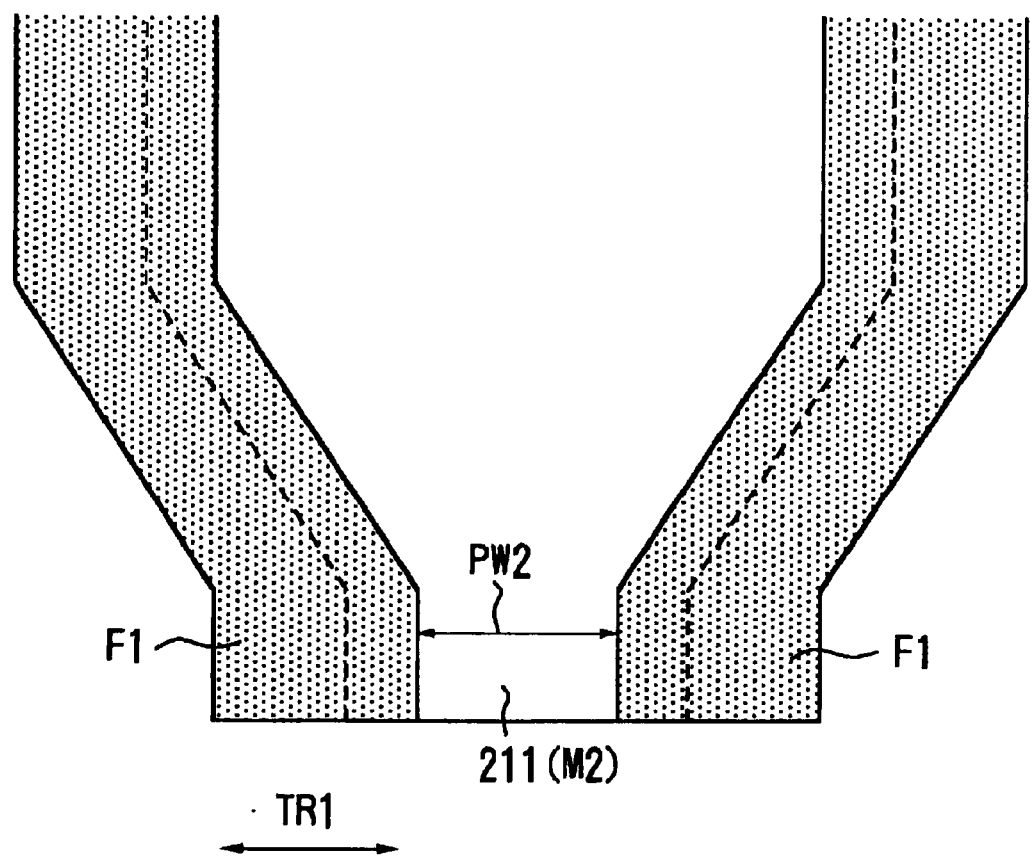
FIG. 10 is a plan view of the step shown in FIG. 9.

Subsequently, as shown in FIGS. 9 and 10, frames F1 are formed on the plate underfilm M2. The frames F1 are separated, on the first magnetic film 221, by distance PW2 in the track direction TR1 parallel to the surface of the film 221 and cover both edges of the film 221 and the part of the gap film 24 around the edges in the track direction TR1. The edges of the first magnetic film 221 are located within the frames F1. The Frames F1 may be made of a photoresist material by a photolithography process.

Figure 11:
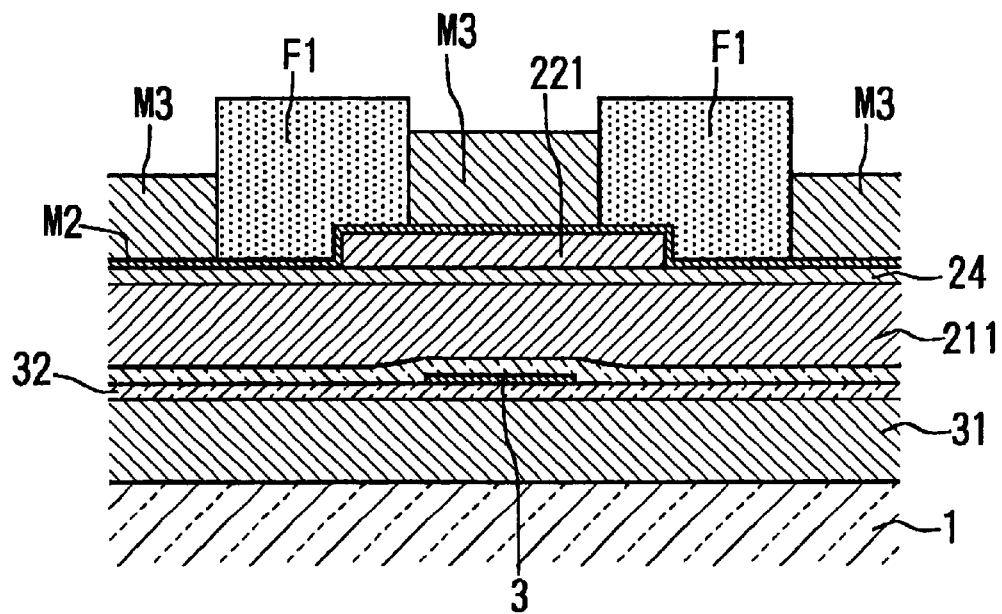
FIG. 11 is a cross sectional view showing the step after the step of FIGS. 9 and 10.

Next, as shown in FIG. 11, a plate film M3 to constitute the second magnetic film 222 (see, FIG. 2) is stuck on the part of the plate underfilm M2 uncovered with the frames F1. The plate film M3 is formed, of a soft magnetic material such as NiFe, CoFe, CoFeNi, in a thickness of 3 μm to 5 μm.

Figure 12:
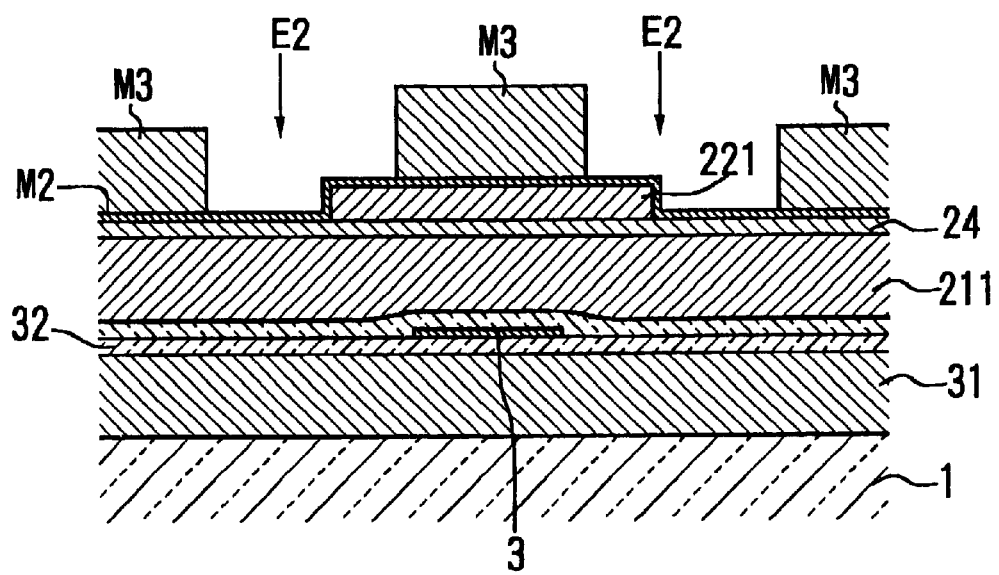
FIG. 12 is a cross sectional view showing the step after the step of FIG. 11.
Figure 13:
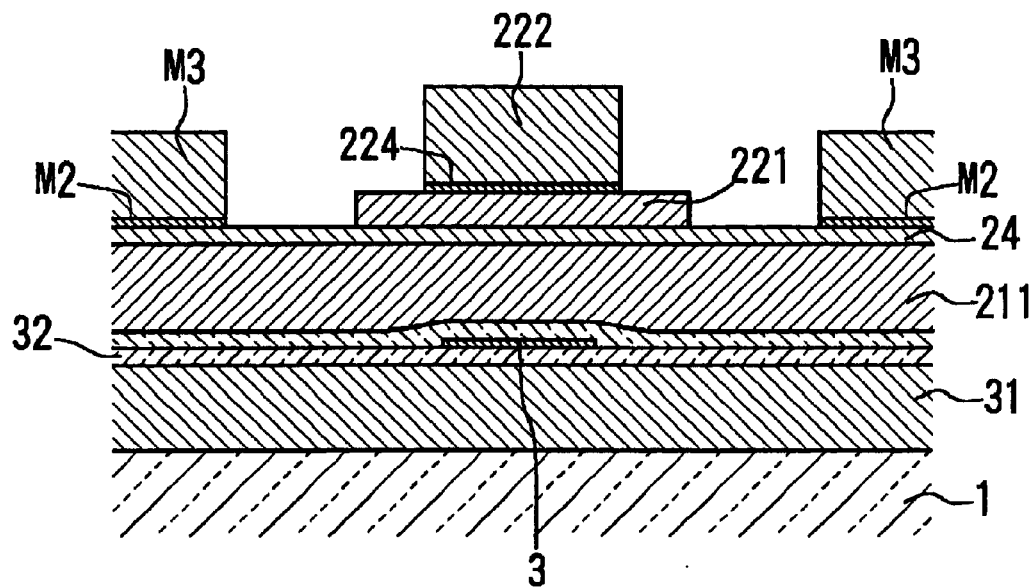
FIG. 13 is a cross sectional view showing the step after the step of FIG. 12.

The frames F1 are removed as shown in FIG. 12, and the part of the plate underfilm M2 exposed after the removing of the frames is removed. The plate underfilm M2 may be removed by dry-etching such as milling or RIE. Since the plate underfilm M2 is extremely thin, as mentioned above, the material constituting the plate underfilm is not re-stuck on the both side surfaces of the first and second magnetic films 221 and 222 in the track direction TR1 when the plate underfilm M2 is removed by dry-etching such as milling or RIE. Moreover, since the first magnetic film 221 is formed in the primary pattern, in the removing process of the plate underfilm M2, only the plate underfilm M2 has to be etched and the first magnetic film 221 does not have to be etched. Therefore, the conventional problems due to the re-sticking of the first magnetic film 221 can be prevented.

Moreover, although in the above removing process of the plate underfilm M2 using dry-etching, the second magnetic film 222 is exposed to the process, the reduction of the second magnetic film 222 can be repressed to the utmost because the plate underfilm M2 is extremely thin. Therefore, the thin film magnetic head having the recording pole structure with high recording performance.

Figure 14:
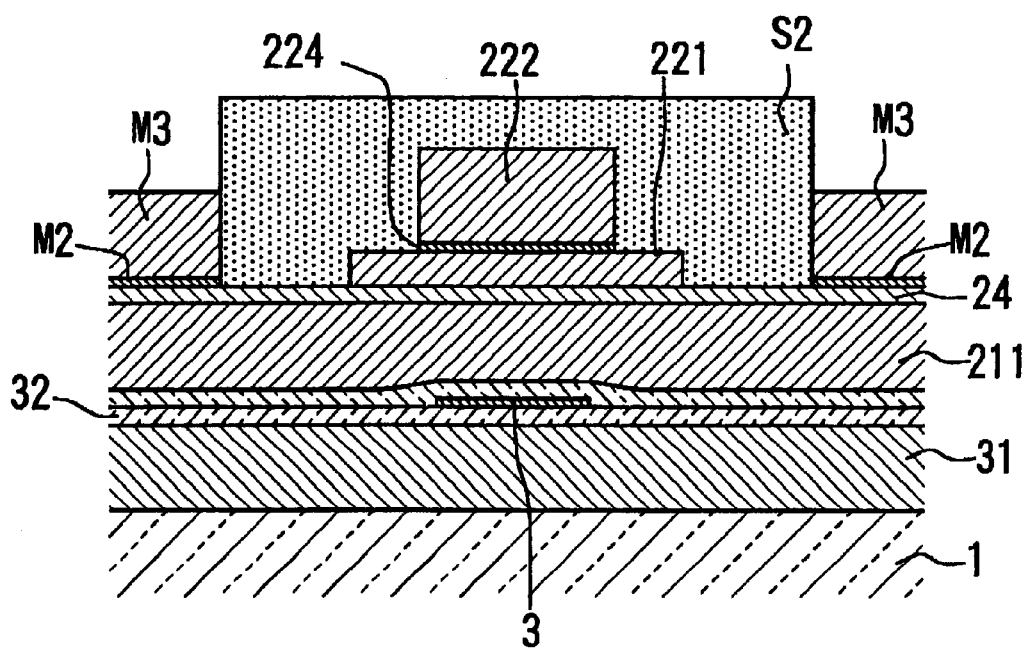
FIG. 14 is a cross sectional view showing the step after the step of FIG. 13.

Next, as shown in FIG. 14, after the plate underfilm M2 is removed, a mask S2 to cover the first and second magnetic films 221, 222 is formed. The mask S2 is made of a photoresist material by a photolithography process.

Figure 15:
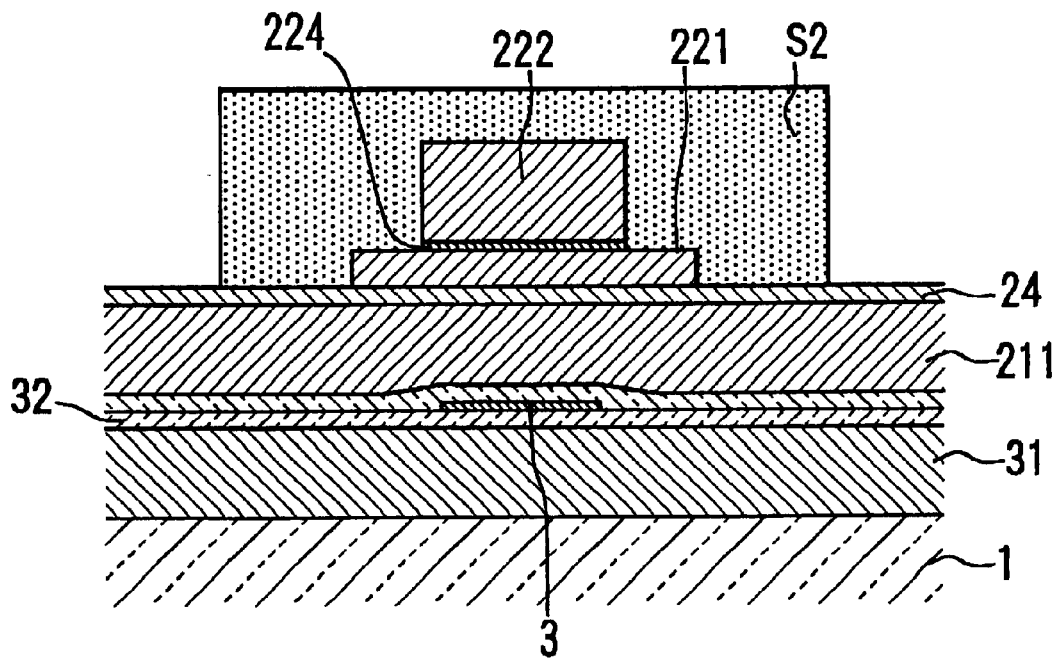
FIG. 15 is a cross sectional view showing the step after the step of FIG. 14.

Subsequently, as shown in FIG. 15, the parts of the plate film M3 and the plate underfilm M2 uncovered with the mask S2 are removed. The plate film M3 and the plate underfilm M2 may be removed by RIE, milling, chemical etching or the like. Since the first and second magnetic film 221, 222 are covered with the mask S2, they are not reduced in this step.

Figure 16:
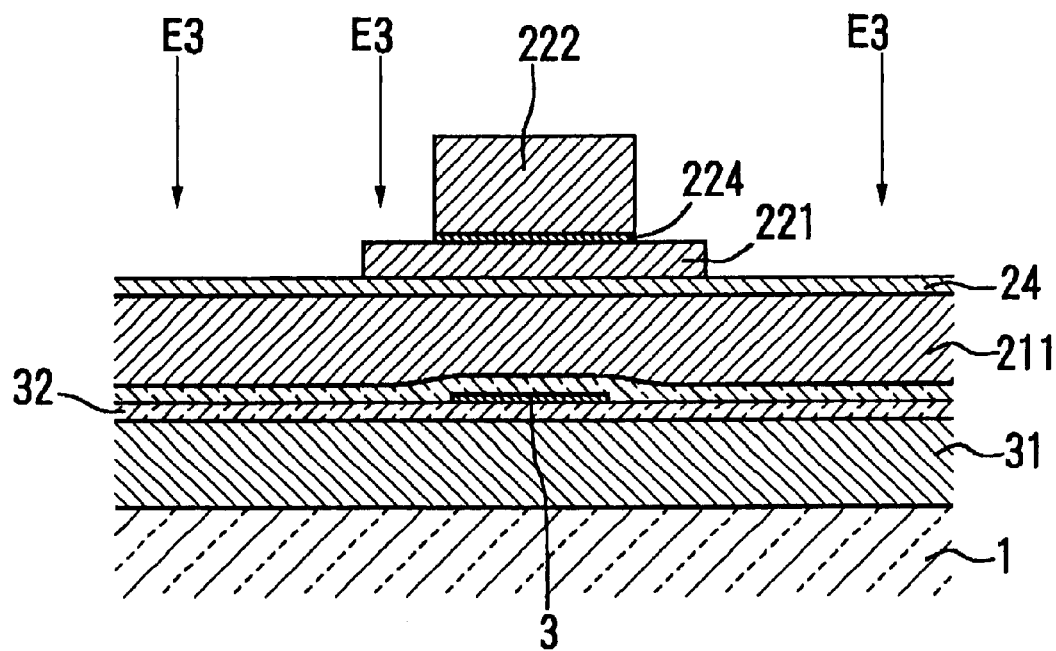
FIG. 16 is a cross sectional view showing the step after the step of FIG. 15.
Figure 17:
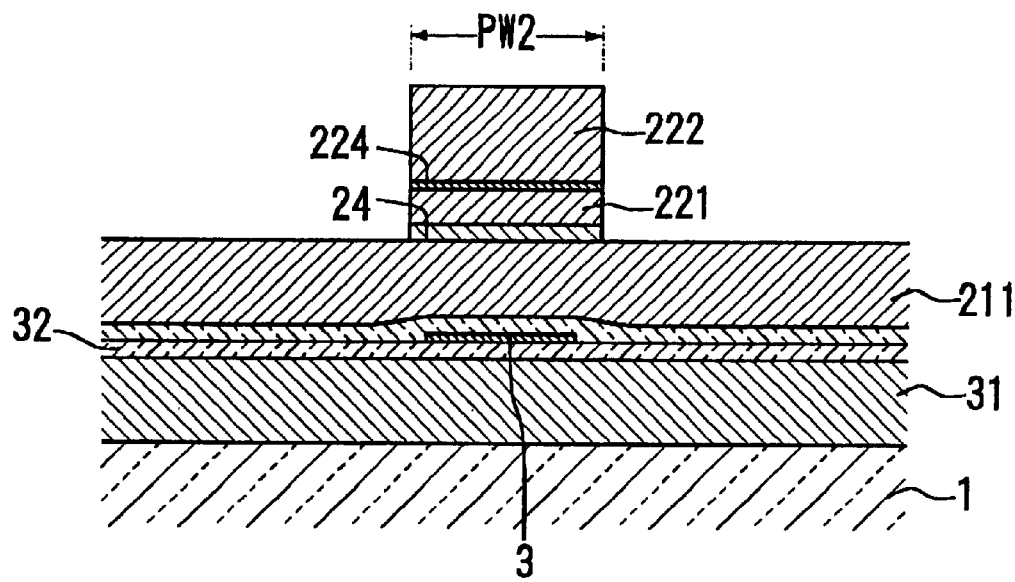
FIG. 17 is a cross sectional view showing the step after the step of FIG. 16.

Next, as shown in FIG. 16, the mask S2 (see, FIGS. 14 and 15) is removed, and the first magnetic film 221 is patterned in its definitive pattern. The patterning is carried out by dry-etching E3 such as milling or RIE. In this way, as shown in FIG. 17, the writing pole portion is formed in the definitive pattern to have a given track width PW2.

In the above process, since the first magnetic film 221 has the primary pattern which is larger than the definitive pattern thereof and of which edges are located within the frames F1 to be used in the frame-plating method, the etching of the first magnetic film 221 by the dry-etching such as RIE or milling can remove the re-stuck material of the first magnetic film 221 from both side surfaces of the first and second magnetic films 221, 222 in the track direction TR1.

Moreover, in the etching of the first magnetic film 221 into the definitive pattern, the parts of the plate film and the plate underfilm, which are stuck for forming the second magnetic film 222, are removed from the area around the first magnetic film 221. Therefore, if the material constituting the first magnetic film 221 is stuck on both side surfaces of the first and second magnetic films 221, 222 in the track direction TR1 due to the pattering of the film 221 by the dry-etching such as RIE or milling, the material can be removed by etching from both sides of the magnetic films having no obstacles in the track direction TR1.

Therefore, if the first magnetic film having a high saturated magnetic flux density is formed thicker adjacent to the gap film 24, the re-sticking almost never occur.

Furthermore, the reduction of the second magnetic film 222 can be repressed to the utmost through the whole steps. Consequently, the thin film magnetic head having the recording pole structure with high recording performance can be obtained.

Second Mode-Manufacturing method

FIGS. 18–30 are cross sectional views showing the steps included in the second mode-manufacturing method of the present invention.

Figure 18:
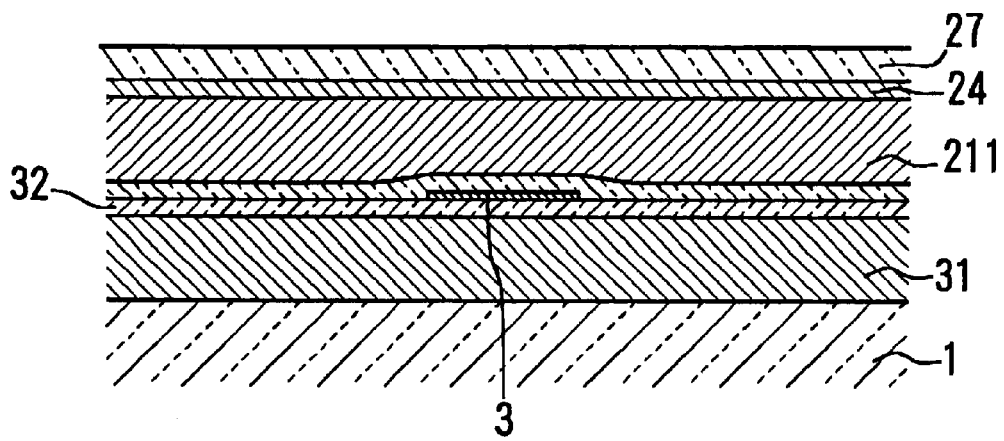
FIG. 18 is a cross sectional view showing one step included in the second mode-manufacturing method of the thin film magnetic head shown in FIGS. 1 and 3.

First of all, as shown in FIG. 18, the non-magnetic film 27 is formed over the gap film 24. The non-magnetic material may be formed of an inorganic insulating material such as $Al_2O_3$, $SiO_2$ or a non-magnetic metallic material by sputtering. The non-magnetic film 27 may be formed flat as shown in FIG. 2. The thickness of the non-magnetic film 27 is determined by the thickness of the first magnetic film 221 to be obtained conclusively.

Figure 19:
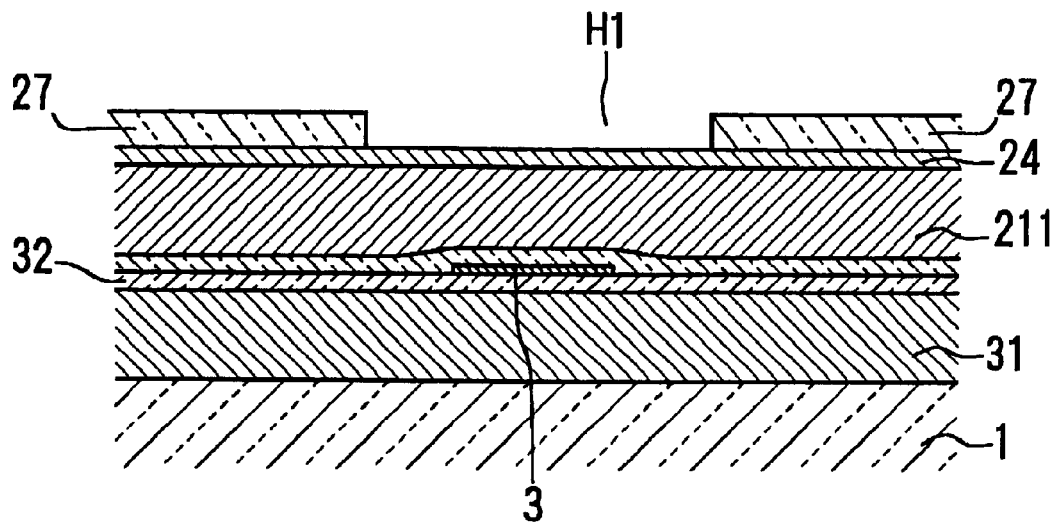
FIG. 19 is a cross sectional view showing the step after the step of FIG. 18.

Next, as shown in FIG. 19, a hollowed hole H1 having the pattern corresponding to the primary pattern of the first magnetic film 221 (see, FIG. 2) is formed in the non-magnetic film 27. The hollowed hole H1 can be formed by dry-etching such as RIE or milling for the non-magnetic film 27 via a mask.

Figure 20:
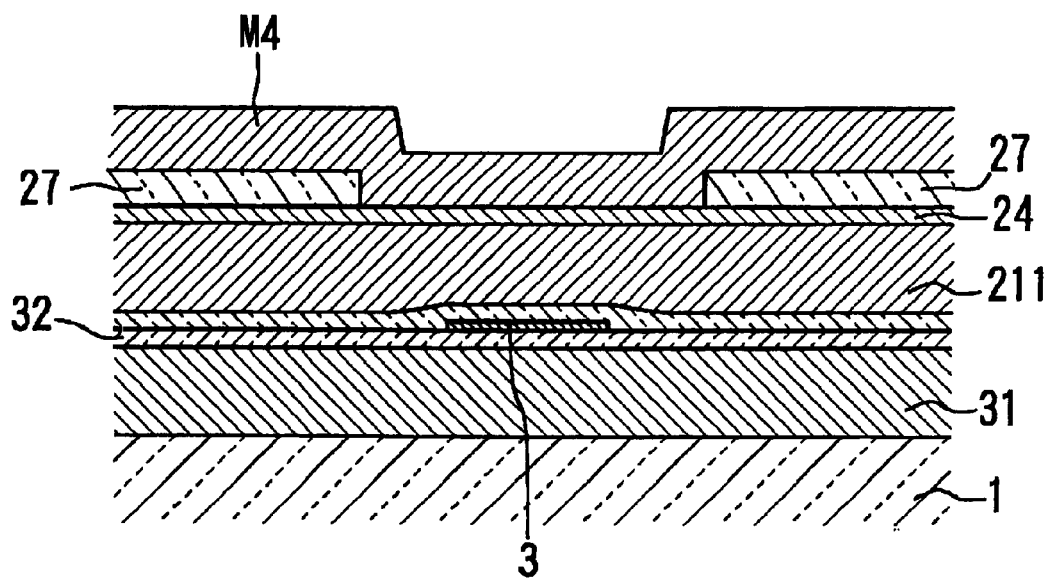
FIG. 20 is a cross sectional view showing the step after the step of FIG. 19.

Subsequently, as shown in FIG. 20, a magnetic film M4 to constitute the first magnetic film 221 (see, FIG. 2) is formed on the remaining non-magnetic film 27 and the part of gap film 24 exposed to the hollowed hole Hi. The thickness and material of the magnetic film M4 may be employed as in the first mode-manufacturing method.

Figure 21:
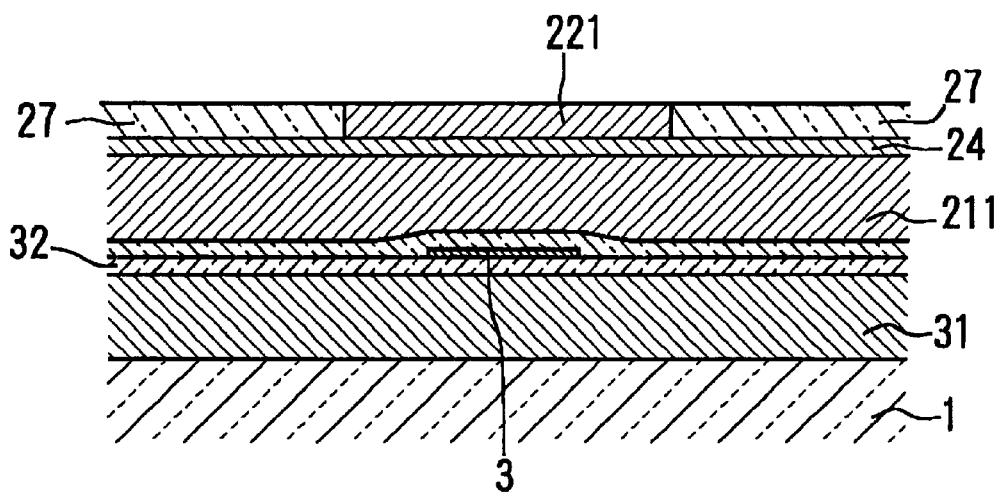
FIG. 21 is a cross sectional view showing the step after the step of FIG. 20.

Next, as shown in FIG. 21, the magnetic film M4 is flattened so that its part formed in the hollowed hole H1 can have the substantially same level as that of the remaining non-magnetic film 27 to form the first magnetic film 221 having the primary pattern. The primary pattern of the first magnetic film 221, as described later, is larger than the definitive pattern thereof, and edges of the primary pattern are located within the frames to be used in the frame-plating method for the second magnetic film. The flattening of the magnetic film M4 may be carried out by chemical mechanical polishing (CMP).

Figure 22:
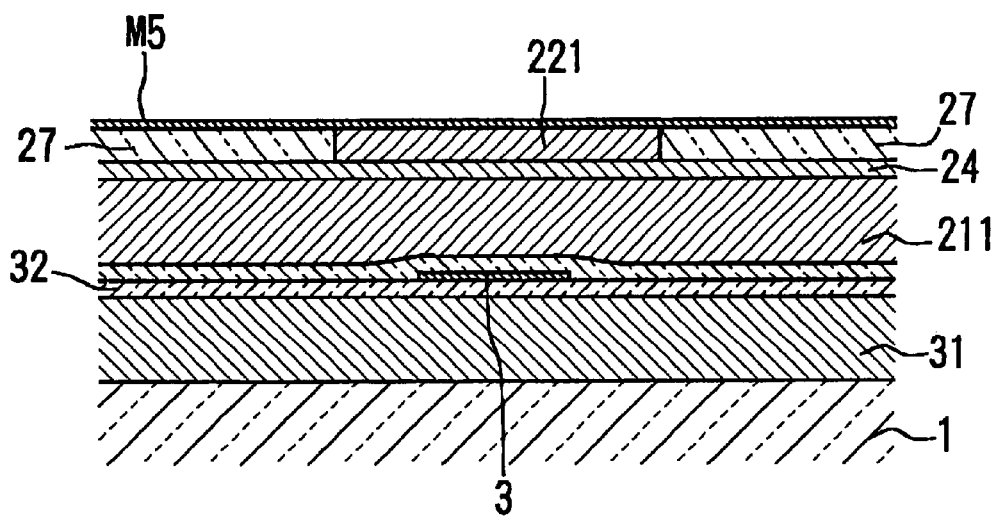
FIG. 22 is a cross sectional view showing the step after the step of FIG. 21.

Thereafter, the similar steps to the ones in the first mode-manufacturing method are performed. That is, as depicted in FIG. 22, a plate underfilm M5 is formed on the first magnetic film 221 and the remaining non-magnetic film 27. The plate underfilm M5 corresponds to the plate underfilm M2 (see, FIG. 8) in the first mode-manufacturing method.

Figure 23:
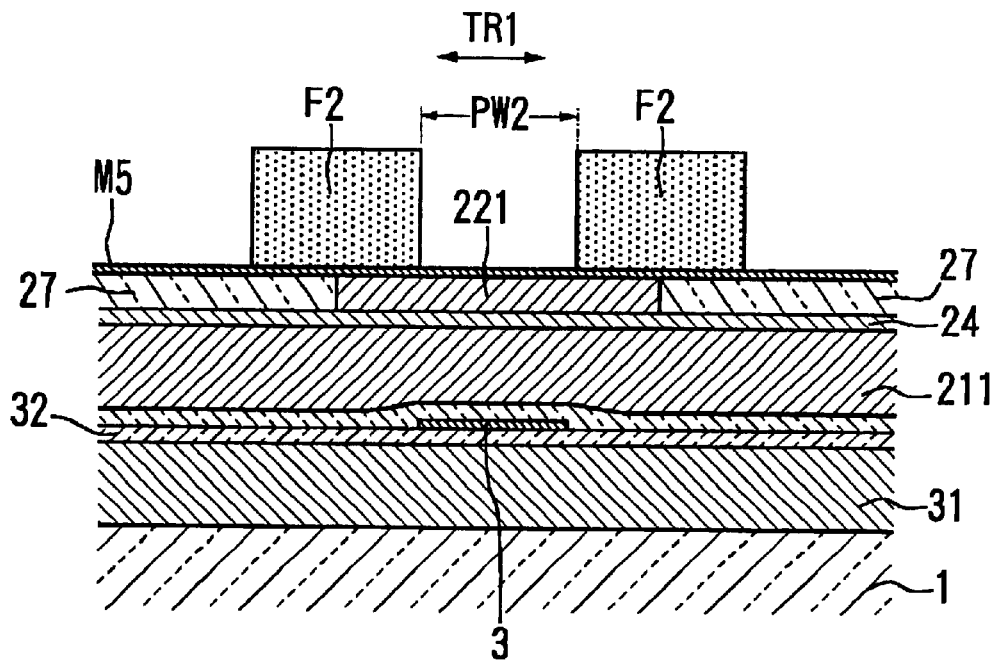
FIG. 23 is a cross sectional view showing the step after the step of FIG. 22.

Subsequently, as shown in FIG. 23, frames F2 are formed in the plate underfilm M5. The frames F2 are separated, on the first magnetic film 221, by distance PW2 in the track direction TR1 parallel to the surface of the film 221 and cover both edges of the film 221 and the part of the gap film 24 around the edges in the track direction TR1. The edges of the first magnetic film 221 are located within the frames F1.

Figure 24:
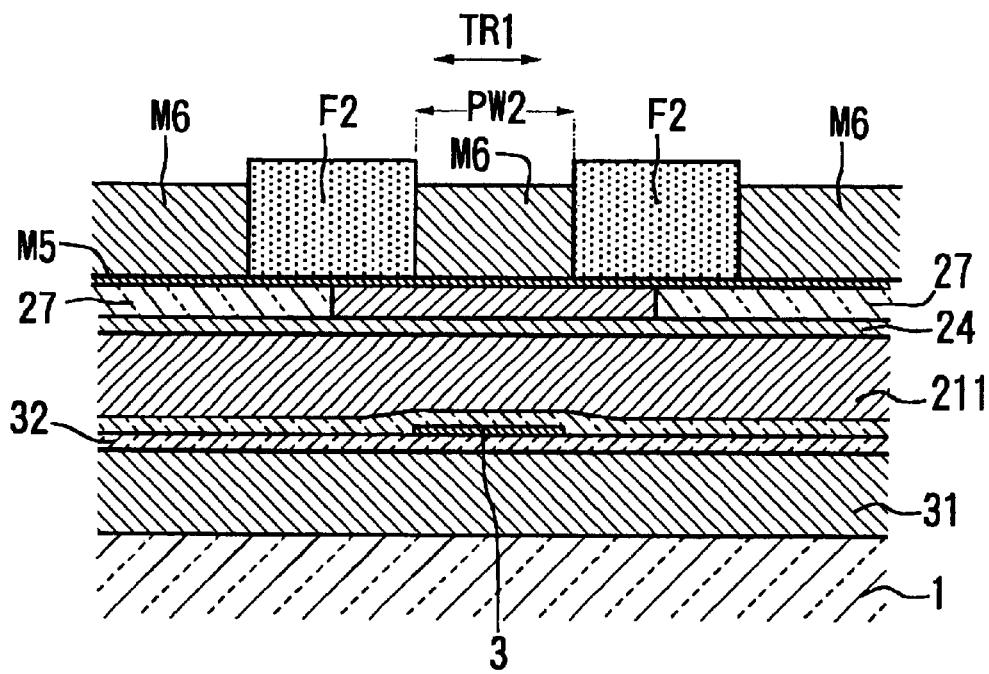
FIG. 24 is a cross sectional view showing the step after the step of FIG. 23.

Next, as shown in FIG. 24, a plate film M6 to constitute the second magnetic film 222 is stuck on the parts of the plate underfilm M5 uncovered with the frames F2.

Figure 25:
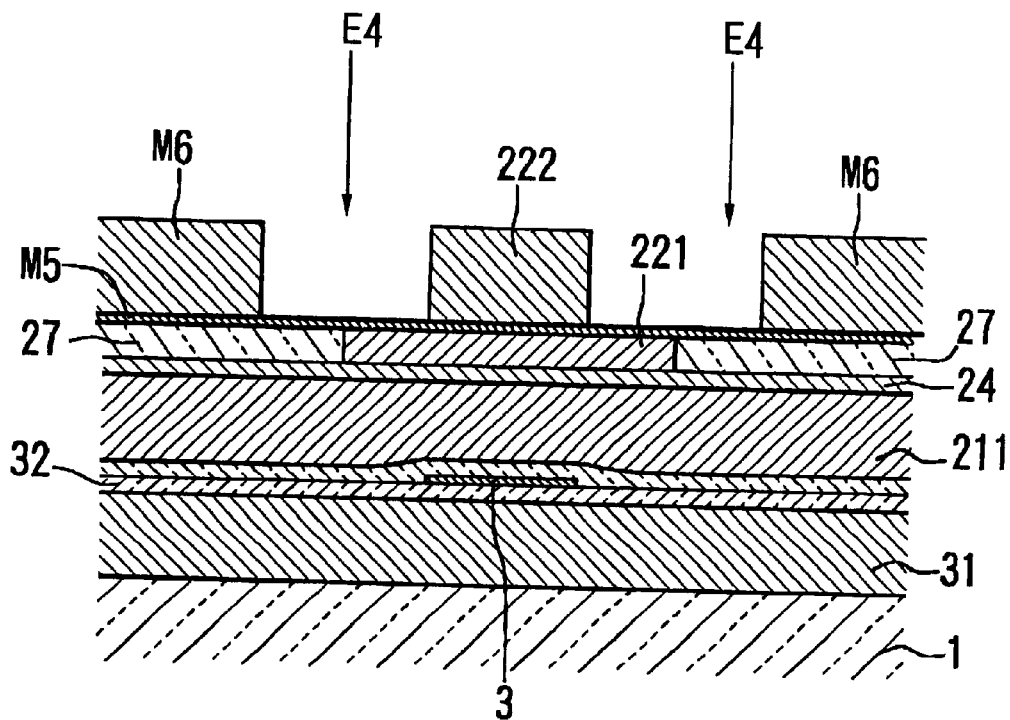
FIG. 25 is a cross sectional view showing the step after the step of FIG. 24.
Figure 26:
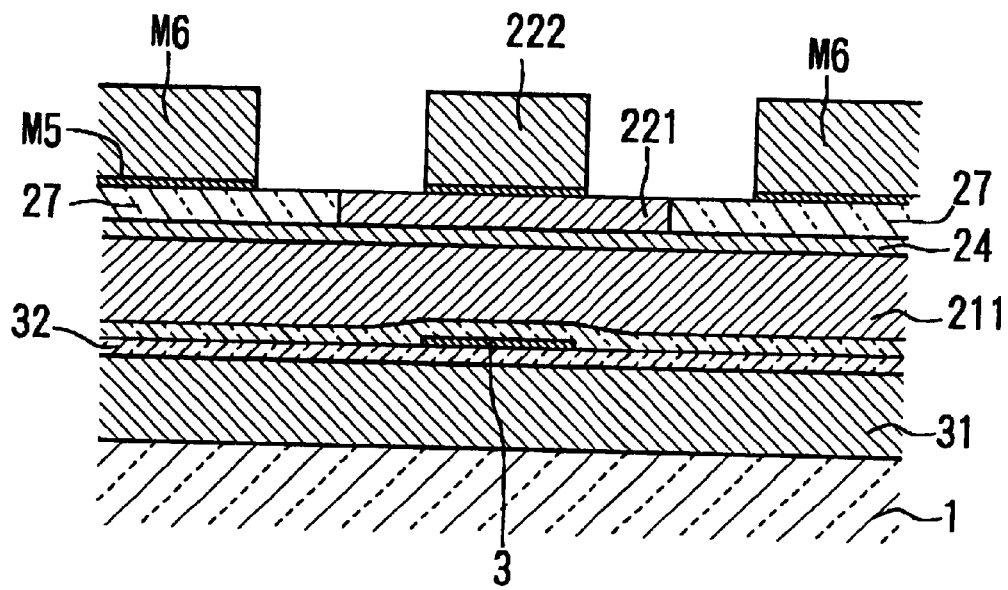
FIG. 26 is a cross sectional view showing the step after the step of FIG. 25.

Subsequently, as shown in FIG. 25, the frames F2 are removed. Then, as shown in FIG. 26, the parts of the plate underfilm M5 exposed after the removing of the frames F2 are removed. Since generally, the plate underfilm M5 is extremely thin, the material constituting the plate underfilm M5 is not stuck on both side surfaces of the first and second magnetic films 221, 222 in the track direction TR1 when the plate underfilm is removed by dry-etching such as RIE or milling. Moreover, since the first magnetic film 221 is already patterned flat so as to have the primary pattern in the above flattening process (see, FIG. 21), in the above removing process of the plate underfilm M5, only the plate underfilm M5 is etched and the first magnetic film 221 is not etched. Therefore, the conventional problems due to the re-sticking of the first magnetic film 221 having a high saturated magnetic flux density can be prevented.

Moreover, although in the above removing process of the plate underfilm M5 using dry-etching, the second magnetic film 222 is exposed to the process, the reduction of the second magnetic film 222 can be repressed to the utmost because the plate underfilm M5 is extremely thin. Therefore, the thin film magnetic head having the recording pole structure with high recording performance can be provided.

Figure 27:
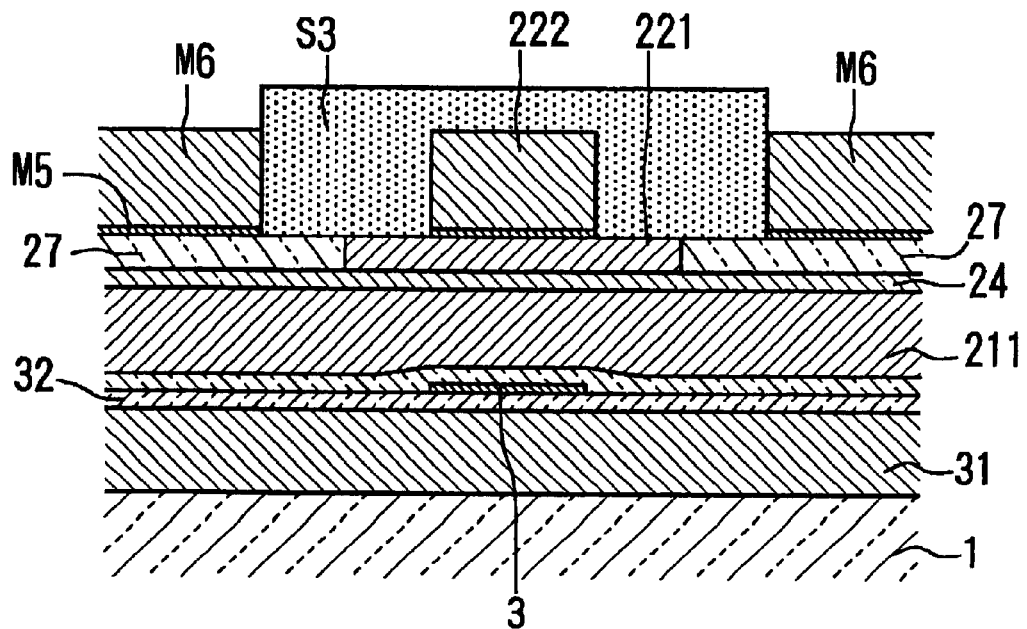
FIG. 27 is a cross sectional view showing the step after the step of FIG. 26.

Next, as shown in FIG. 27, after the plate underfilm M5 is removed, a mask S3 to cover the first and second magnetic films 221, 222 is formed.

Figure 28:
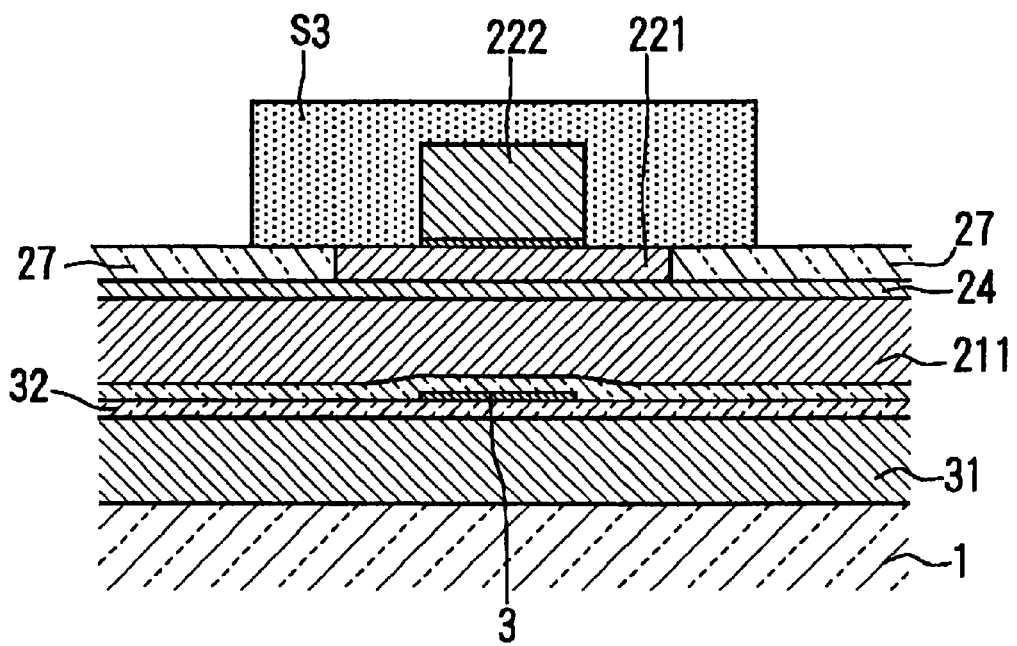
FIG. 28 is a cross sectional view showing the step after the step of FIG. 27.

Subsequently, as shown in FIG. 28, the parts of the plate film M6 and the plate underfilm M5 uncovered with the mask S3 are removed. The plate film M6 and the plate underfilm M5 may be removed by RIE, milling, chemical etching or the like. Since the first and second magnetic film 221, 222 are covered with the mask S3, they are not reduced in this step.

Figure 29:
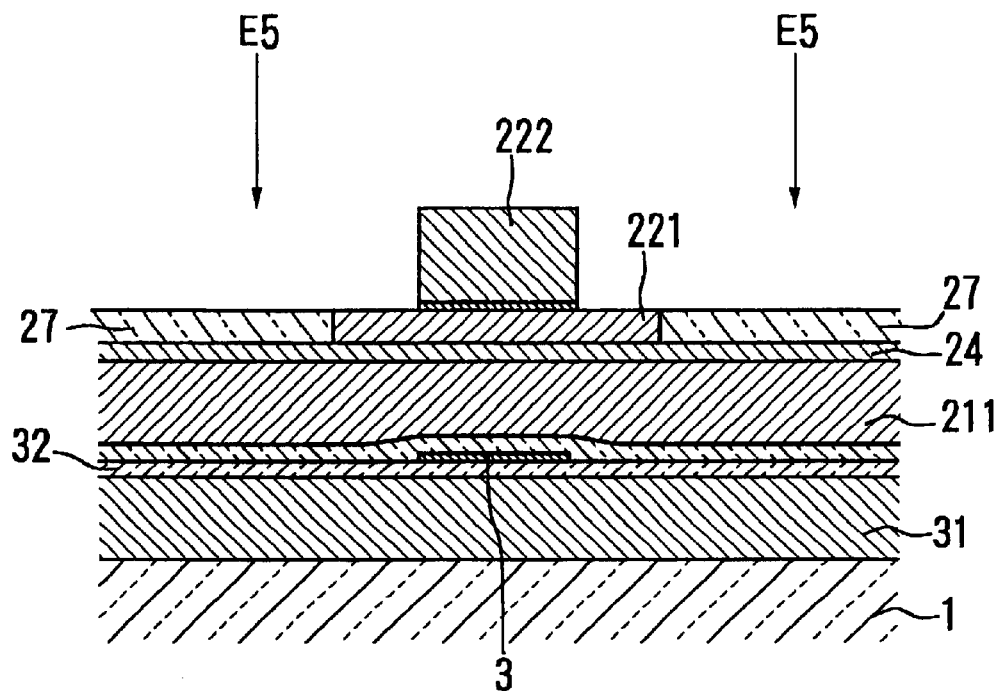
FIG. 29 is a cross sectional view showing the step after the step of FIG. 28.
Figure 30:
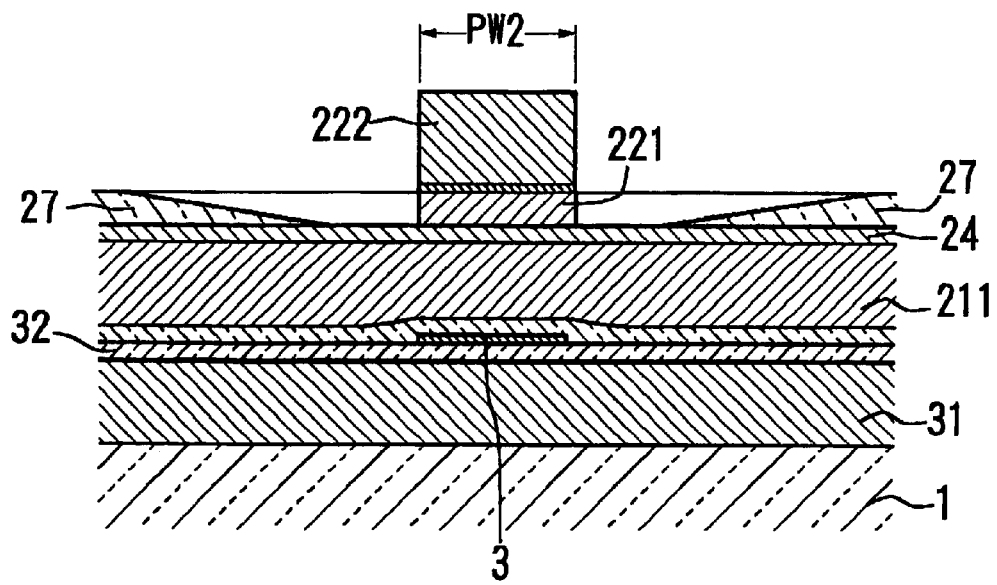
FIG. 30 is a cross sectional view showing the step after the step of FIG. 29.

Next, as shown in FIG. 29, the mask S3 (see, FIG. 28) is removed, and dry-etching E5 such as RIE or milling is performed. As a result, as shown in FIG. 30, the first magnetic film 221 is patterned in its definitive pattern having track width PW2. In the above process, since the first magnetic film 221 has the primary pattern which is larger than the definitive pattern thereof and of which edges are located within the frames F1 to be used in the frame-plating method, the etching of the first magnetic film 221 by the dry-etching such as RIE or milling can remove the re-stuck material of the first magnetic film 221 from both side surfaces of the first and second magnetic films 221, 222 in the track direction TR1.

Moreover, in the etching of the first magnetic film 221 into the definitive pattern, the parts of the plate film M6 and the plate underfilm M5 (see, FIG. 27), which are stuck for forming the second magnetic film 222, are removed from the area around the first magnetic film 221. Therefore, if the material constituting the first magnetic film 221 is stuck on both side surfaces of the first and second magnetic films 221, 222 in the track direction TR1 due to the pattering of the film 221 by the dry-etching such as RIE or milling, the material can be removed by etching from both sides of the magnetic films having no obstacles in the track direction TR1.

Therefore, if the first magnetic film having a high saturated magnetic flux density is formed thicker adjacent to the gap film 24, the re-sticking almost never occur. Furthermore, since the reduction of the second magnetic film 222 can be repressed to the utmost through the whole steps, the thin film magnetic head having the recording pole structure with high recording performance can be obtained.

Figure 31:
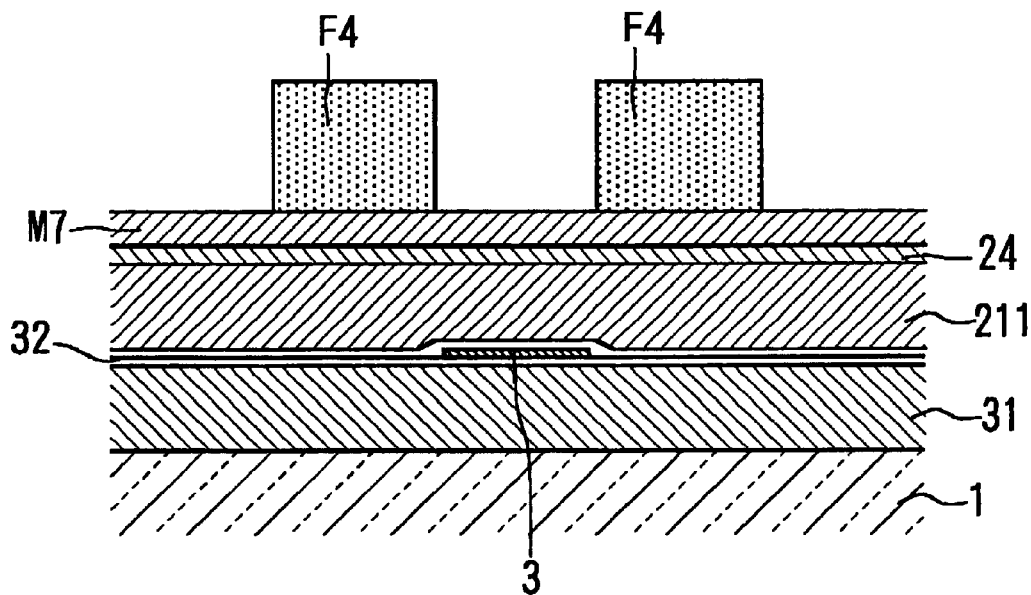
FIG. 31 is a cross sectional view showing one step included in a conventional manufacturing method of a thin film magnetic head.
Figure 32:
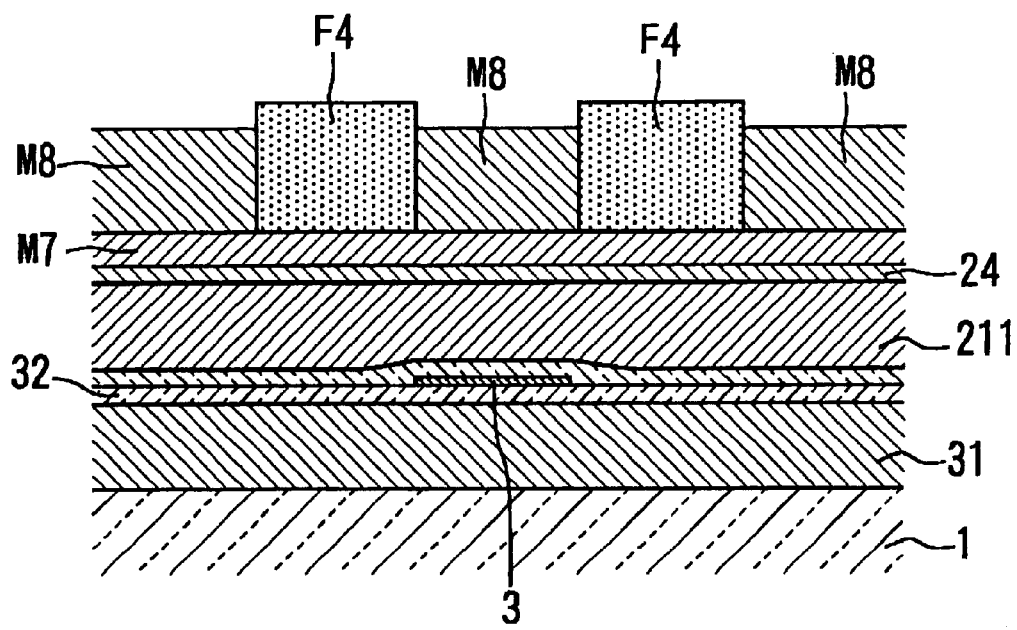
FIG. 32 is a cross sectional view showing the step after the step of FIG. 31.

Compared with the conventional manufacturing steps shown in FIGS. 31–34, the advantages in the manufacturing method of the present invention can be much clarified. In the conventional manufacturing method, first of all, as shown in FIG. 31, a magnetic film M7 to constitute the first magnetic film 221 (see, FIG. 2) is formed, frames F4 are formed on the first magnetic film M7. Next, as shown in FIG. 32, a plate film M8 is stuck on the part of the magnetic film M7 uncovered with the frame F4.

Figure 33:
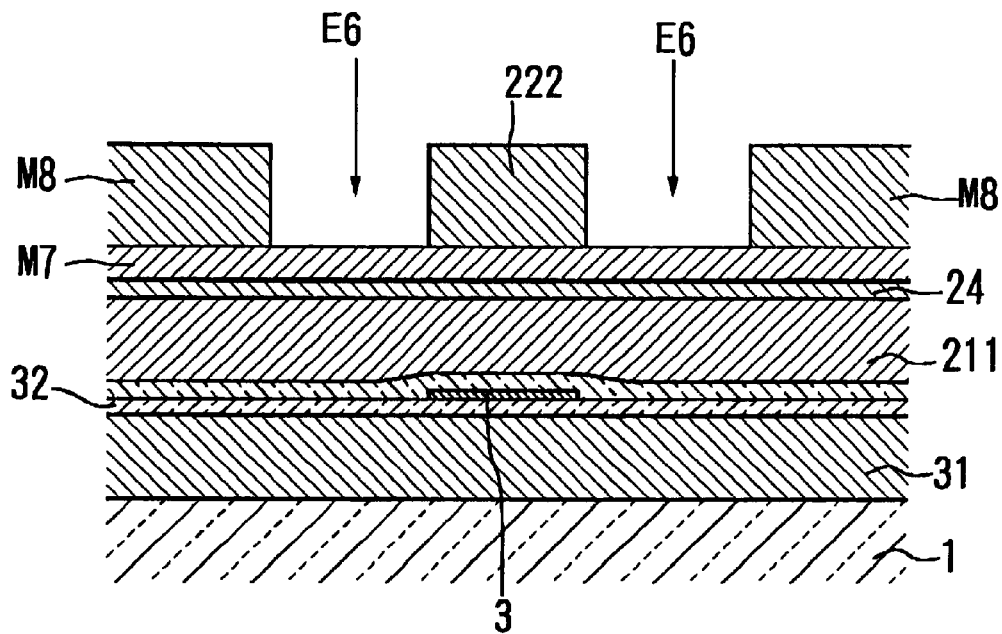
FIG. 33 is a cross sectional view showing the step after the step of FIG. 32.
Figure 34:
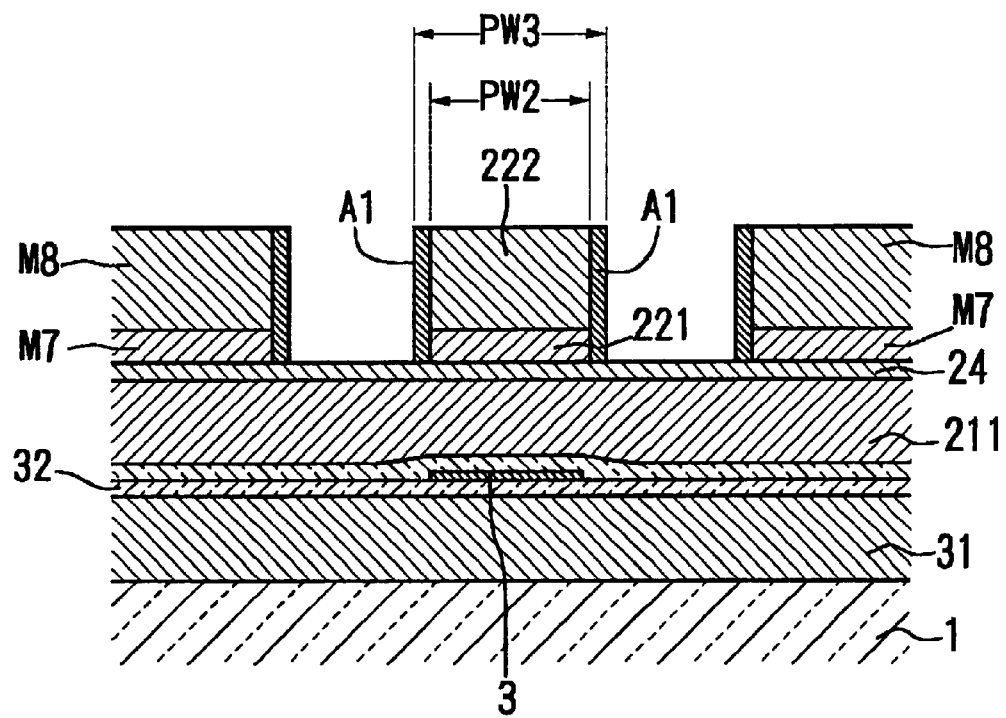
FIG. 34 is a cross sectional view showing the step after the step of FIG. 33.

Subsequently, as shown in FIG. 33, the frames F4 (see, FIG. 32) are removed, and as shown in FIG. 34, dry-etching E6 such as RIE or milling for the magnetic film M7 is performed using the second magnetic film 222 composed of the plate film M8 to define the track width of the recording track.

As mentioned above, conventionally, in defining the track width of the recording pole portion, the magnetic film M7 having a high saturated magnetic flux density as an underfilm has to be etched by milling or the like using the second magnetic film 222 as a mask. In the milling process, the magnetic materials constituting the magnetic films M7 and M8 are stuck on the side surfaces, etc. of the pole portion. The re-stuck portions A1 (see, FIG. 34) enlarge the track width into width PW3 from desired width PW2. This means the opposite result to the narrowing of the track width. More-over, the re-stuck portions A1 usually has inferior magnetic characteristics, so that the electromagnetic conversion characteristics of the pole portion is deteriorated.

If the magnetic film M7 is formed thinner, the re-sticking can be repressed. However, the thinner magnetic film M7 degrades the recording performance of the pole portion, and can not achieve the original object to enhance the recording performance. It is apparent that the manufacturing method of the present invention can solve the above problems.

Although in the above embodiments, the manufacturing method of the present invention is applied for the thin film magnetic head shown in FIG. 2, it is obvious that the manufacturing method can be applied for the thin film magnetic head in FIG. 3 by varying more or less the steps included in the above manufacturing method.

This invention has been described in detail with reference to the above preferred concrete embodiments, but it is obvious for the ordinary person skilled in the art that various modifications can be made in its configuration and detail without departing from the scope of this invention.

As mentioned above, this invention can provide the following effects:
(a) A method for manufacturing a thin film magnetic head in which the re-sticking is almost never brought about if a magnetic film, provided adjacent to a gap film, having a high saturated magnetic flux density is thicker can be provided.

(b) A method for manufacturing a thin film magnetic head having a recording pole structure of high recording performance can be provided.

What is claimed is:

1. A method for manufacturing a thin film magnetic head comprising a recording pole portion including a first pole portion, a gap film adjacent to the first pole portion and a second pole portion having a first magnetic film and a second magnetic film, the first magnetic film being adjacent to the gap film and having a higher saturated magnetic flux density than the second magnetic film, the second magnetic film being adjacent to the first magnetic film, comprising the steps of:

forming the first magnetic film on the gap film, forming a mask having a primary pattern larger than a definitive pattern of the first magnetic film on the first magnetic film, forming the first magnetic film into the primary pattern by removing a part of the first magnetic film which is not covered with the mask, removing the mask, forming a plate underfilm on the first magnetic film having the primary pattern and the gap film, forming, on the plate underfilm, the frames to be used in the frame-plating method for the second magnetic film so as to be separated, on the first magnetic film, in a track direction parallel to a surface of the first magnetic film and cover both edges of the primary pattern of the first magnetic film and a part of the gap film around the edges, sticking a plate film to be the second magnetic film on a part of the plate underfilm which is not covered with the frames, removing a part of the plate underfilm exposed after removing the frames, forming a mask to cover the first and second magnetic films after removing the plate underfilm, removing a part of the plate film and plate underfilm which is not covered with the mask, and etching the first magnetic film into the definitive pattern through the second magnetic film as a mask after removing the mask.

2. The method for manufacturing a thin film magnetic head as defined in claim 1, wherein the thin film magnetic head further comprises a reading magnetoresistive effective element.

3. A method for manufacturing a thin film magnetic head comprising a recording pole portion including a first pole portion, a gap film adjacent to the first pole portion and a second pole portion having a first magnetic film and a second magnetic film, the first magnetic film being adjacent to the gap film and having a higher saturated magnetic flux density than the second magnetic film, the second magnetic film being adjacent to the first magnetic film, comprising the steps of:

forming the first pole portion;

forming the gap film over the first pole portion; and forming the second pole portion over the gap film and the first pole portion, wherein forming the second pole portion comprises forming the first magnetic film on the gap film in a primary pattern which is larger than a definitive pattern, forming frames to be used in a frame-plating method for forming the second magnetic film on the first magnetic film so that the frames cover edges of the first magnetic film and define a region having a smaller area than the primary pattern of the first magnetic film, forming the second magnetic film by the frame-plating method over a portion of the primary pattern between the frames, and etching only the first magnetic film and the gap film to form the definitive pattern using only the second magnetic film as a mask so that the second pole portion is narrower than the first pole portion.

4. The method for manufacturing a thin film magnetic head as defined in claim 3, wherein the thin film magnetic head further comprises a reading magnetoresistive effective element.

* * * * *